United States Patent
Kuromatsu et al.

(10) Patent No.: US 8,226,006 B2
(45) Date of Patent: Jul. 24, 2012

(54) CODE READER DEVICE WHICH DISPLAYS A CODE EXTRACTING AREA OF A SUBJECT IMAGE TO HAVE A SIZE BASED ON A SPECIFIED DISPLAY SIZE OF THE SUBJECT IMAGE, AND RECORDING MEDIUM THEREFOR

(75) Inventors: Tetsuya Kuromatsu, Ome (JP); Tomonori Irie, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 43 days.

(21) Appl. No.: 12/582,461

(22) Filed: Oct. 20, 2009

(65) Prior Publication Data
US 2010/0038427 A1 Feb. 18, 2010

Related U.S. Application Data

(62) Division of application No. 11/584,984, filed on Oct. 23, 2006, now abandoned.

(30) Foreign Application Priority Data

Oct. 26, 2005 (JP) .................................. 2005-310968

(51) Int. Cl.
*G06K 7/10* (2006.01)
*G06K 9/32* (2006.01)
*H04N 5/262* (2006.01)
(52) U.S. Cl. ............... 235/462.11; 382/298; 348/240.99
(58) Field of Classification Search ............. 235/462.01, 235/462.08, 462.09, 462.11, 462.23, 462.24, 235/462.45, 472.01, 462.1, 462.41, 454; 348/333.01–333.03, 333.11, 333.12, 240.2, 348/240.99, 208.6; 358/451; 382/298–300
See application file for complete search history.

(56) References Cited

U.S. PATENT DOCUMENTS

| | | | |
|---|---|---|---|
| 5,659,167 A | | 8/1997 | Wang et al. |
| 5,821,523 A | | 10/1998 | Bunte et al. |
| 6,008,837 A | * | 12/1999 | Yonezawa ................... 348/211.8 |
| 7,090,136 B2 | * | 8/2006 | Muramatsu ............. 235/462.25 |
| 7,733,389 B2 | * | 6/2010 | Kurosawa et al. ......... 348/240.2 |
| 2004/0227836 A1 | * | 11/2004 | Tanaka ..................... 348/333.11 |
| 2005/0147327 A1 | * | 7/2005 | Choi et al. ..................... 382/299 |
| 2010/0321536 A1 | * | 12/2010 | Lee et al. ................. 348/240.99 |

FOREIGN PATENT DOCUMENTS

| | | |
|---|---|---|
| JP | 2005-004642 A | 1/2005 |
| WO | WO 93/18478 A | 9/1993 |

OTHER PUBLICATIONS

International Preliminary Report on Patentability and Written Opinion dated Feb. 14, 2007, issued in International Application No. PCT/JP2006/321581 filed Oct. 23, 2006, 9 sheets.

* cited by examiner

*Primary Examiner* — Daniel Hess
*Assistant Examiner* — Suezu Ellis
(74) *Attorney, Agent, or Firm* — Holtz, Holtz, Goodman & Chick, P.C.

(57) ABSTRACT

A code reader device, prior to extracting a code from an image captured by a camera, receives an image size data, and according to the received image size, displays the captured image on the display device so that a code extracting target area is discriminated from a remaining area. A layout of the captured image on a display screen becomes flexible, so that usability for reading the code can be improved.

8 Claims, 12 Drawing Sheets

| SIZE OF PREVIEW IMAGE | WIDTH OF PREVIEW IMAGE | HEIGHT OF PREVIEW IMAGE | ZOOM SIZE (ANGLE OF VIEW) | IMAGE SIZE (DISPLAY AREA) | | CODE EXTRACTING TARGET AREA IN PREVIEW IMAGE | |
|---|---|---|---|---|---|---|---|
| | | | | WIDTH | HEIGHT | WIDTH | HEIGHT |
| 4/9 VGA | 426 | 320 | 1.0 | 1160 | 870 | 141 | 105 |
| | | | 1.5 | 773 | 580 | 211 | 158 |
| | | | 2.0 | 580 | 435 | 282 | 211 |
| | | | 3.0 | 386 | 290 | 423 | 317 |
| 1/4 VGA | 320 | 240 | 1.0 | 1160 | 870 | 105 | 79 |
| | | | 1.5 | 773 | 580 | 158 | 119 |
| | | | 2.0 | 580 | 435 | 211 | 158 |
| | | | 3.0 | 386 | 290 | 318 | 238 |
| 1/9 VGA | 213 | 160 | 1.0 | 1160 | 870 | 70 | 52 |
| | | | 1.5 | 773 | 580 | 105 | 79 |
| | | | 2.0 | 580 | 435 | 141 | 105 |
| | | | 3.0 | 386 | 290 | 211 | 158 |
| 1/16 VGA | 160 | 120 | 1.0 | 1160 | 870 | 52 | 39 |
| | | | 1.5 | 773 | 580 | 79 | 59 |
| | | | 2.0 | 580 | 435 | 105 | 79 |
| | | | 3.0 | 386 | 290 | 159 | 119 |

FIG.12
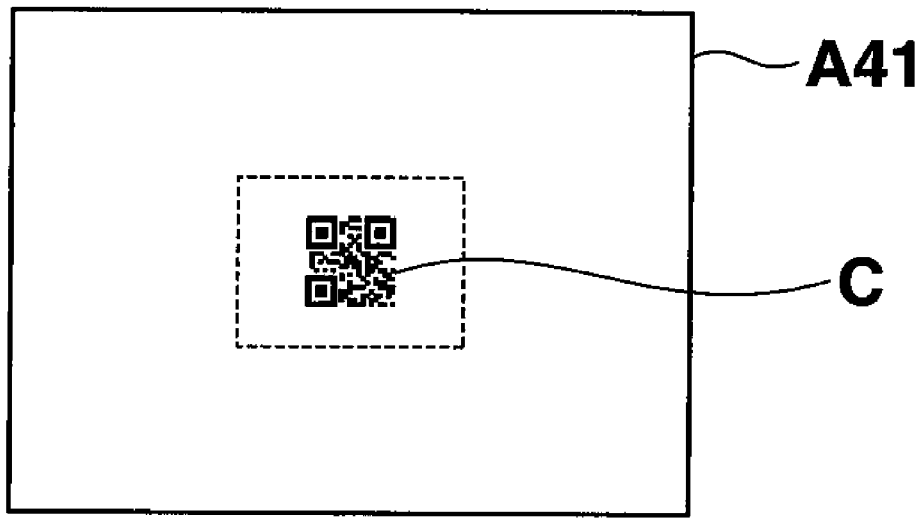
REDUCING LUMINANCE OF IMAGE DATA OUTSIDE DECODE AREA
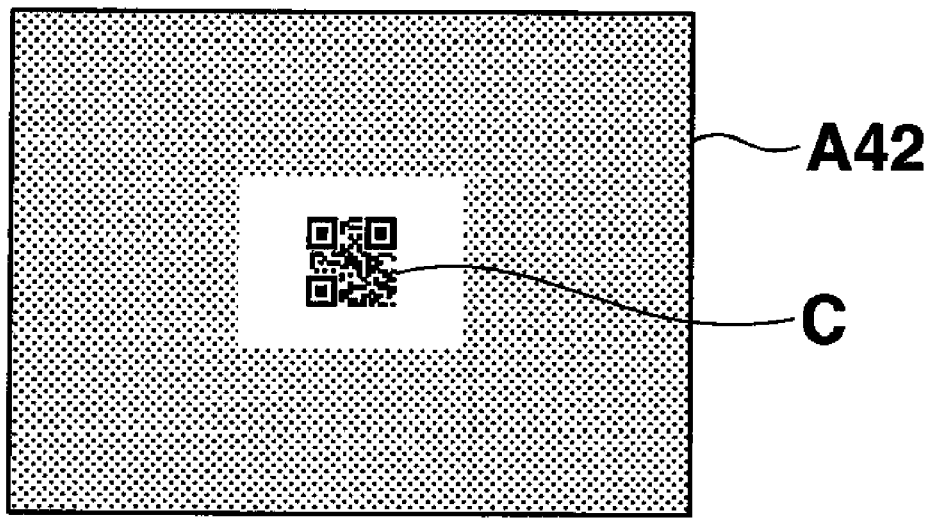

CODE READER DEVICE WHICH DISPLAYS A CODE EXTRACTING AREA OF A SUBJECT IMAGE TO HAVE A SIZE BASED ON A SPECIFIED DISPLAY SIZE OF THE SUBJECT IMAGE, AND RECORDING MEDIUM THEREFOR

CROSS-REFERENCE TO RELATED APPLICATIONS

The present application is a Divisional application of U.S. application Ser. No. 11/584,984 filed Oct. 23, 2006, now abandoned which is based upon and claims the benefit of priority from prior Japanese Patent Application No. 2005-310968, filed Oct. 26, 2005, the entire contents of both of which are incorporated herein by reference.

BACKGROUND OF THE INVENTION

1. Field of the Invention

The present invention relates to a code reader device for reading a code such as a bar code or a two-dimensional code, and a recording medium.

2. Description of the Related Art

Conventionally, a code reader device for reading a code, such as a bar code or a two-dimensional code, captures the code by an image sensor such as a charge coupled device (CCD) or a complementary metal-oxide semiconductor (CMOS), displays the captured image with a frame on a display screen such as a liquid crystal display (LCD), detects the code within the frame, and decodes the detected code. In order for the code reader device to properly read the code, a user adjusts a shooting direction, with the help of the frame displayed on the LCD, such that the code is located within the frame.

For example, in Jpn. Pat. Appln. KOKAI Publication No. 2005-4642, as a technique similar to the code reader device described above, there is disclosed a mobile phone having a camera function, comprising a display device which displays a captured image, a frame displaying device which displays a frame on the captured image, and a bar code extracting device which extracts a bar code image from the inside of the frame on the captured image.

However, with the camera-equipped mobile phone, it is difficult to arrange a layout flexibly on a display screen such that the captured code is displayed with an enlarged size, and an area indicating the decoded information or operation information is displayed with a reduced size. In other words, there is a problem that a usability of this kind of camera is not satisfactory.

BRIEF SUMMARY OF THE INVENTION

According to one aspect of the present invention, there is provided a code reader device which extracts a code from an image and decodes the code, the image including a code extracting area and a remaining area, the code reader device comprises:

an image size specifying unit which specifies a display size of the image, prior to extracting the code from the image; and a display unit which displays the image with the display size specified by the image size specifying unit such that the code extracting area is distinguished from the remaining area.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention in which:

FIG. 12 is a view showing a display example of displaying the code extracting target area differently from the remaining area with respect to the luminance.

DETAILED DESCRIPTION OF THE INVENTION

Embodiments of a code reader device according to the present invention will now be described with reference to FIGS. 1 to 12. The present invention is not limited to the embodiments and terms used for explaining the embodiments are not limited to the terms in the following description.

First, an external configuration of a code reader device 1 is described.

Figure 1:
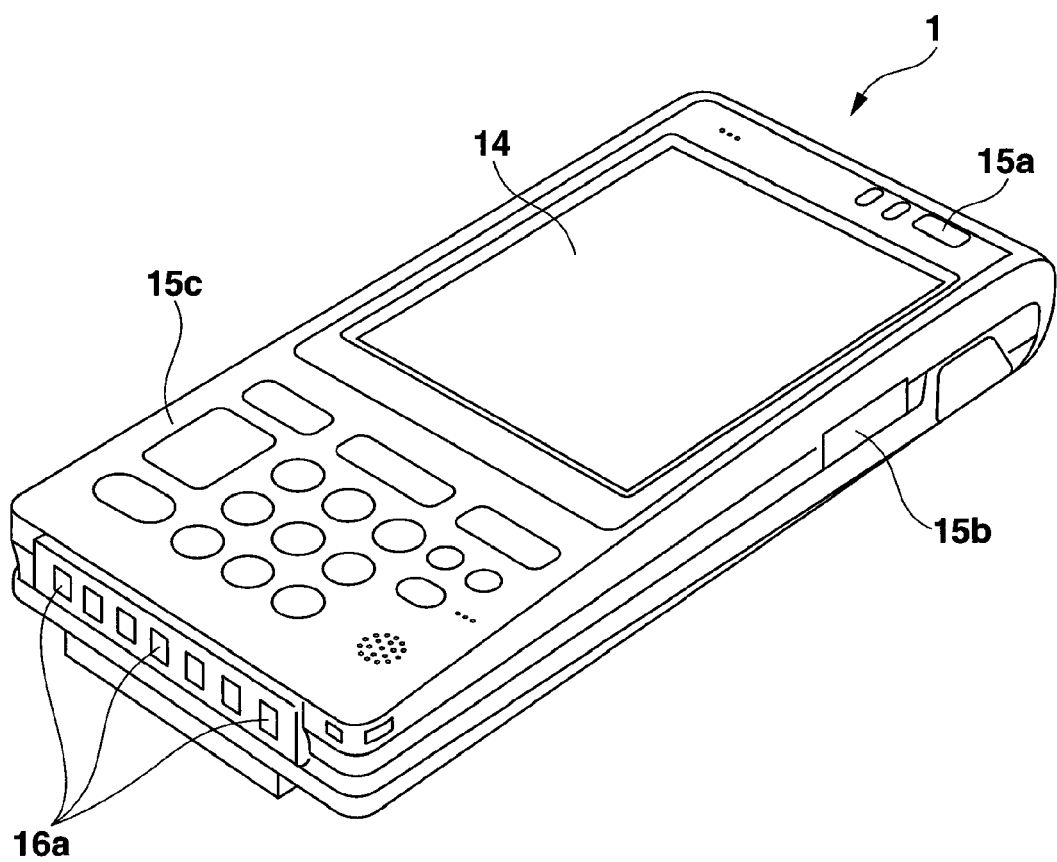
FIG. 1 is a front perspective view of a code reader device 1.

FIG. 1 is a front perspective view of a code reader device 1. The code reader device 1 is provided as a camera-equipped portable terminal such as a camera-equipped portable phone (cellular telephone) or a camera-equipped personal digital assistance (PDA). The code reader device 1 includes a display device 14 in an upper half of its front face and an input device 15 on the other area of the front face and on a right side surface. The input device 15 includes a power key 15a, a trigger key 15b, and other various function keys 15c including alphanumeric keys for inputting numbers 0 to 9 or characters such as alphabets, and cursor keys. The input device 15 outputs a key operation signal to a CPU 10 described later with reference to FIG. 3. A plurality of charging terminals 16a are provided at the lower end of the main body of the code reader device 1 for charging power to a power source 16 which is an incorporated secondary battery described later with reference to FIG. 3.

Figure 2:
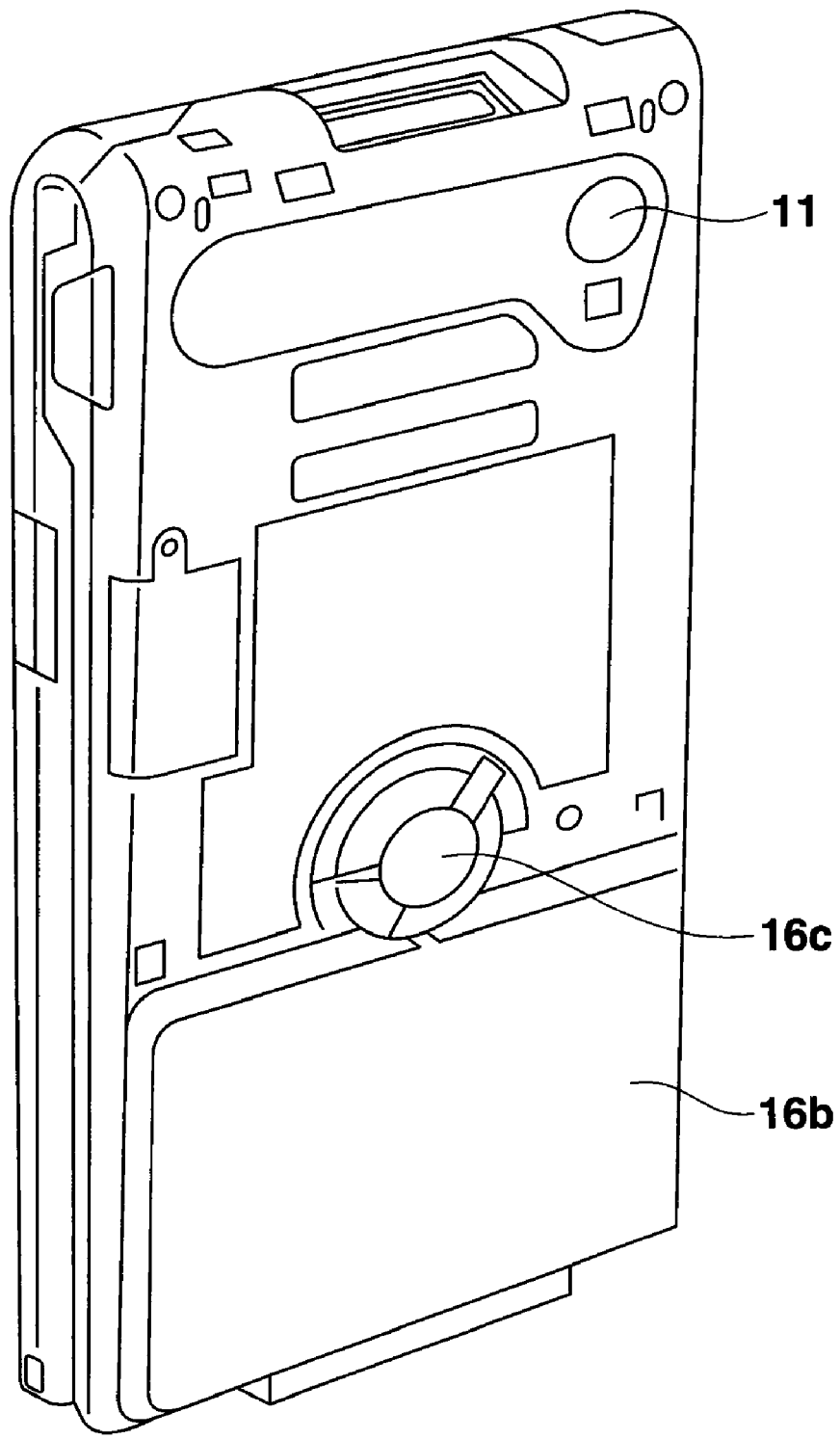
FIG. 2 is a rear perspective view of the code reader device 1.

FIG. 2 is a rear perspective view of the code reader device 1. The code reader device 1 includes a camera 11 provided at an upper part of its back face. The camera 11 is a digital camera with a built-in optical image sensor such as a charge coupled device (CCD) or a complementary metal-oxide semiconductor (CMOS). A battery cover 16b is provided at the back face of the code reader device 1 for opening and closing a battery housing unit that houses a secondary battery as a power supply 16 described later with reference to FIG. 3. A fixing member (lock knob) 16c which fixes and releases the battery cover 16b is provided at an end part of the battery cover 16b.

Subsequently, an internal configuration of the code reader device 1 is described hereinafter.

Figure 3:
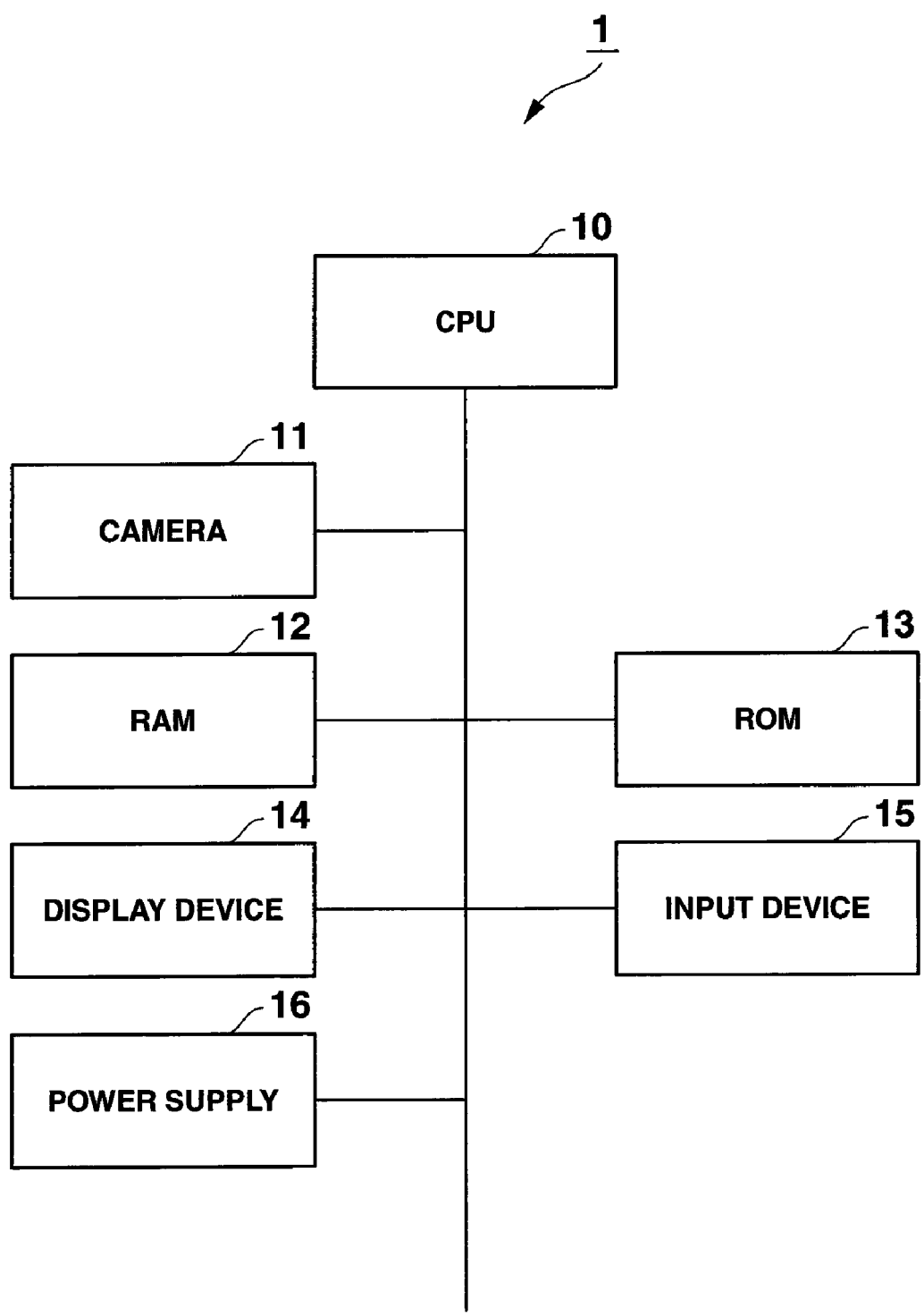
FIG. 3 is a schematic block diagram showing an electric configuration of the code reader device 1.

FIG. 3 is a schematic block diagram showing an electric configuration of the code reader device 1. As shown in FIG. 3, the code reader device 1 is composed of a central processing unit (CPU) 10, the camera 11, a random access memory (RAM) 12, a read only memory (ROM) 13, the display device 14, the input device 15, and the power source 16, and the components are interconnected to each other via a bus.

The CPU 10 uses the RAM 12 as a work area, expands a variety of control programs or setting data stored in the ROM 13 into the work area, and sequentially executes the programs, thereby controls each unit and device of the code reader device 1.

Specifically, the CPU 10 carries out operational processing described later, on the basis of the operating programs stored in the ROM 13. The operational processing of the CPU 10 is carried out as follows. Prior to extraction of a code from a captured image, a size for displaying the captured image is specified, and a code extracting target area (decode area) is displayed according to the specified size so that the target area is discriminated from remaining area on the captured image. The code extracting target area is a target of code decoding processing on the captured image.

Figure 4:
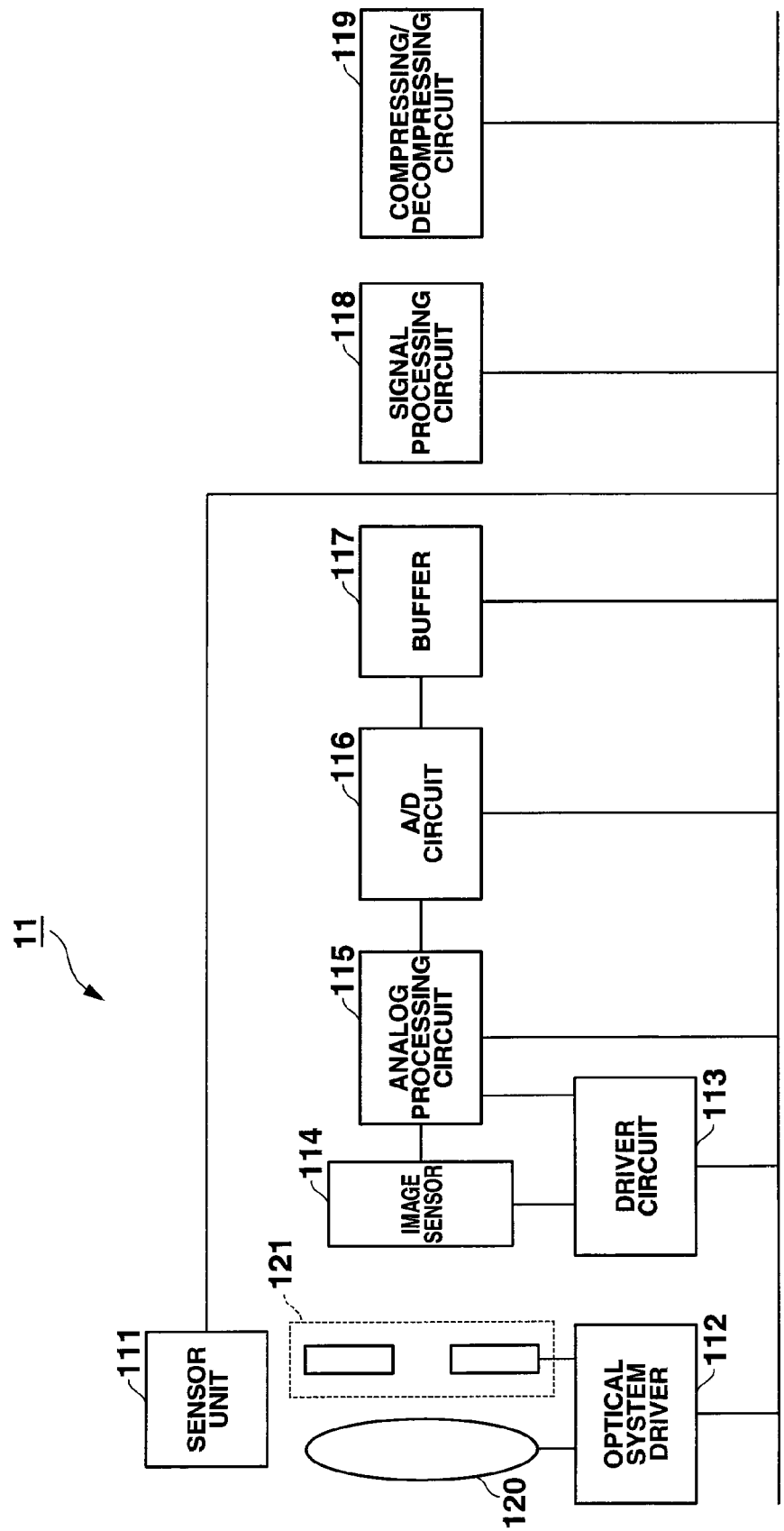
FIG. 4 is a schematic block diagram showing an electric configuration of a camera 11.

The camera 11, as shown in FIG. 4, comprises a sensor unit 111, an optical system driver 112, a driver circuit 113, an image sensor 114, an analog processing circuit 115, an A/D circuit 116, a buffer 117, a signal processing circuit 118, a compressing/decompressing circuit 119, an optical lens 120, and a shutter 121. Image data captured by the image sensor 114 is output after converted into a predetermined format in response to an instruction from the CPU 10.

The sensor unit 111 is composed of, not shown in particular, a distance measuring circuit with an infrared-ray projector and a receiver, and an exposure measuring circuit with a photoconductor such as CdS. The sensor unit 111 outputs a distance value and an exposure value of an image capturing object located within an image shooting direction to the CPU 10.

The optical system driver 112 drives the optical lens 120 or the shutter 121 by means of a stepping motor, an electromagnetic solenoid, or the like. According to an instruction from the CPU 10 depending on the distance or exposure value obtained by the sensor unit 111, the optical lens 120 is moved so that an image formed on the image sensor 114 is focused on the image capturing object, and the exposure is controlled with the shutter 121 in order that a quantity of light incoming to the image sensor 114 becomes proper.

The driver circuit 113 sequentially captures charges generated by photoelectric conversion for each pixels of the image sensor 114 as an image signal, and sends the signal to the analog processing circuit 115. The image sensor 114 is composed of an optical sensor such as a CCD or a CMOS, and outputs an image formed on an imaging area of the image sensor, as an image signal corresponding to each pixel.

The analog processing circuit 115 includes a correlated double sampling (CDS) circuit which reduces noise in the image signal, and an automatic gain control (AGC) circuit which amplifies the image signal. The analog processing circuit carries out required analog signal processing onto the image signal input from the image sensor 114, and outputs the analog image signal to the A/D circuit 116.

The A/D circuit 116 converts the analog image signal input from the analog processing circuit 115 into a digital image signal, and outputs the converted digital image signal to the buffer 117. The buffer 117 temporarily stores the digital image signal, and sequentially outputs the signal to the signal processing circuit 118 or compressing/decompressing circuit 119 in response to an instruction from the CPU 10. It is possible to output the digital image signal corresponding to a predetermined area, which is extracted by specifying an address pointer of the stored digital image data, from the buffer 117.

The signal processing circuit 118 includes a digital signal processor (DSP), not shown in particular. The signal processor circuit 118 carries out image processing such as luminance processing, color processing, and detection of an object (detection of a code) in the captured image on the basis of predetermined threshold value, to the input digital image signal. The image processing may include calculating sharpness of a predetermined area of the image so as to output the calculated sharpness into the CPU 10. In this manner, the CPU 10 can adjust a position of the optical lens 120 in a focused state in which the sharpness becomes maximal and a contrast becomes high.

The compressing/decompressing circuit 119 compresses and decompresses the digital input image signal with a predetermined encoding scheme, and outputs the resulting signal to the CPU 10. Both of a lossless or lossy compression/decompression system may be used. For example, Adaptive Discrete Cosine Transform (ADCT), or conversion to Joint Photographic Experts Group (JPEG) image using Huffman encoding processing, which is an entropy encoding scheme, can be acceptable.

The optical lens 120 adjusts a lens position by the optical system driver 112, and forms (focuses) an image of a capturing object onto an imaging area on the image sensor 114. The optical lens 120 may be configured to adjust an angle of view by adjustment of lens allocation with the optical system driver 112 using a plurality of lenses, and to enable optical zoom. This angle-of-view adjustment using the optical lens 120 is explicitly described as "the optical zoom" in order to discriminate it from a description relating to an angle of view described later. With respect to the shutter 121, a plurality of shutter vanes (not shown in particular) are located between the optical lens 120 and the image sensor 114, and the shutter vanes are driven by the optical system driver 112, thereby a quantity of passing light can be controlled.

The display device 14 comprises a display screen composed of a liquid crystal display (LCD). The display device 14 displays an image on the display screen by required display processing according to display signals input from the CPU 10. The display screen is not limited to the LCD. The display device may be composed of another display element which can be built in a portable terminal.

The input device 15 has the power key 15a, the trigger key 15b, and other various function keys 15c such as cursor keys, as shown in FIG. 1, and outputs a key operating signal to the CPU 10. The input device 15 may include a rotating body such as a dial key or a rotary trackball which outputs a rotational position of a rotating body as an operating signal, other than the operating keys. In particular, in order to instruct a level of increase and decrease, such as expansion and reduction, or in order to instruct a moving direction such as up, down, left or right direction, it is preferable to accept the operating instruction from the rotating body.

The power source 16 supplies electric power from a battery power source (not shown) into each unit and device of the code reader device 1 in response to an instruction from the CPU 10 or an operation of the power key. The battery power source houses a built-in secondary batteries such as a nickel-cadmium accumulator, a nickel-hydride battery, or a lithium ion battery. In addition, the built-in secondary batteries can be charged by a charger connected to the plurality of charging terminals 16a. The battery power source is not limited to the secondary battery, and may be primary batteries such as an alkaline dry battery or a manganese dry battery.

Figure 5:
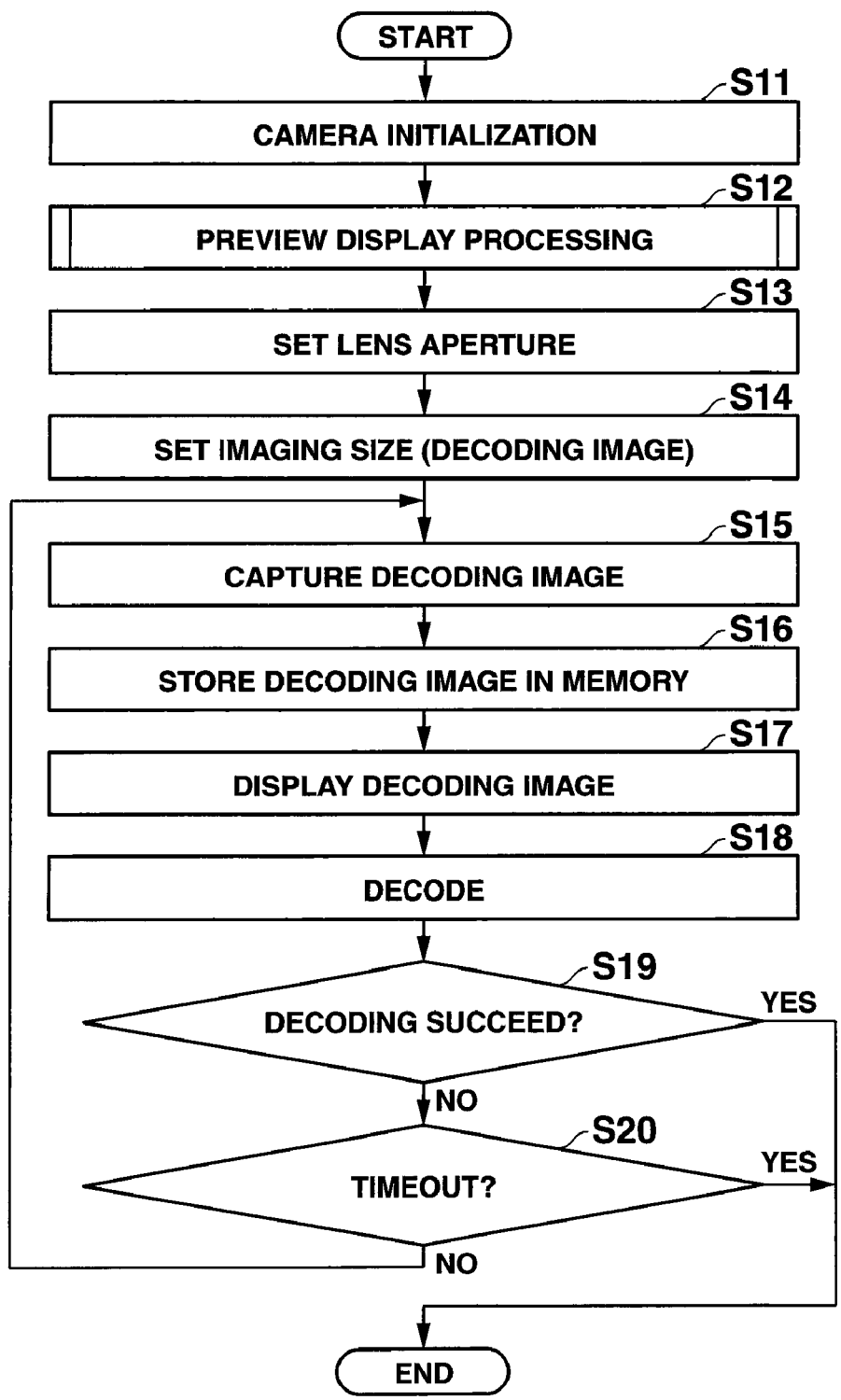
FIG. 5 is a flow chart showing an operation of code reading processing in the code reader device 1.

Subsequently, an operation of code reading processing in the code reader device 1 is described with reference to a flow chart shown in FIG. 5. As shown in FIG. 5, in step S11, the camera 11 performs initialization thereof including movement to an initial position of the optical lens 120 and shutter 121, and resetting of the buffer 117. Next, the flow goes to step S12 in which preview display processing is executed to display a captured image on the screen, prior to the extraction of a code from the captured image.

Figure 6:
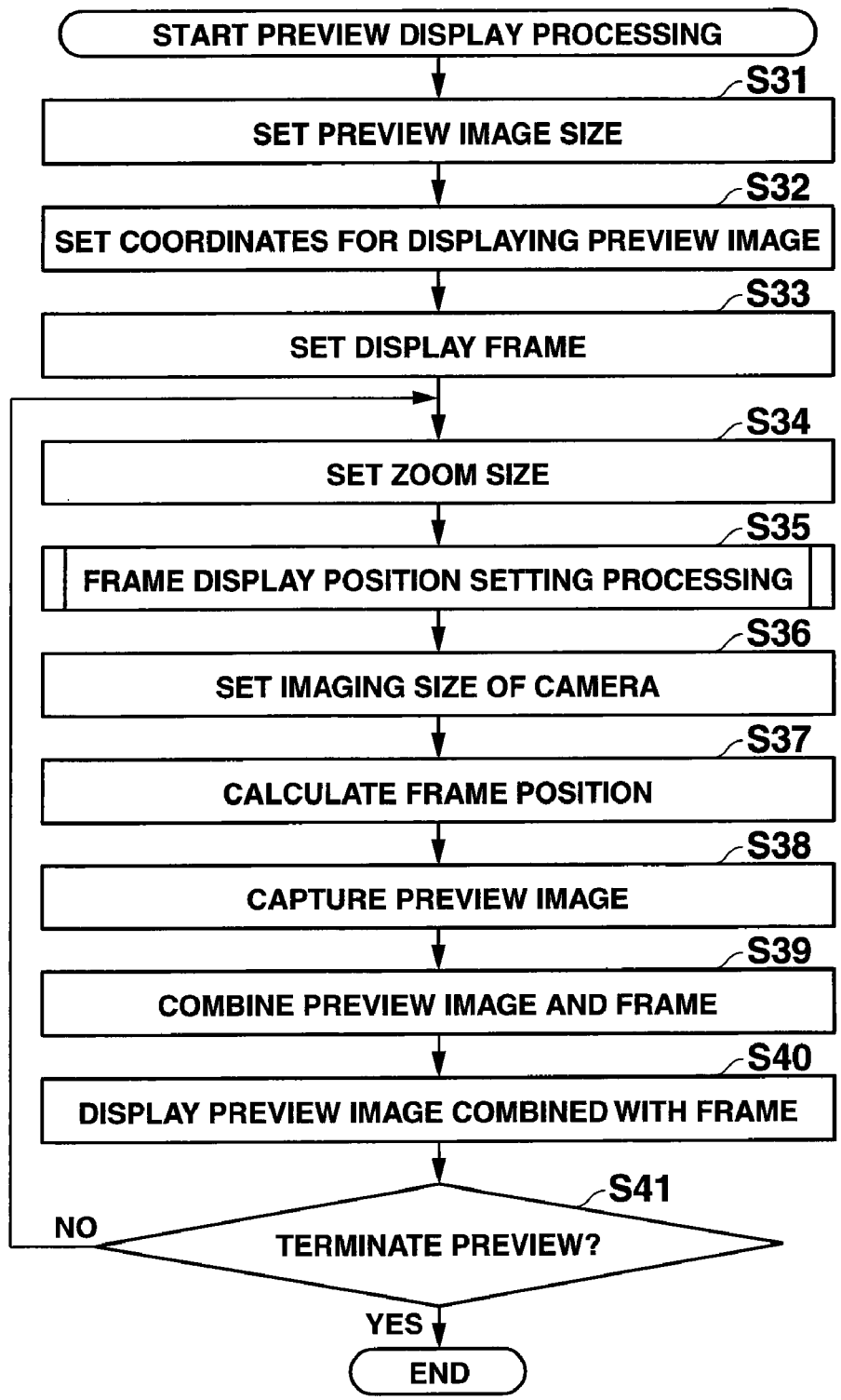
FIG. 6 is a flow chart showing an operation of preview display processing in the code reader device 1.

Details of the preview display processing in step S12 is shown in FIG. 6.

When the preview display processing is started, a size of a preview image on a display screen is set in step S31 according to an instruction from the input device 15, as shown in FIG. 6.

Figures 9A, 9B:
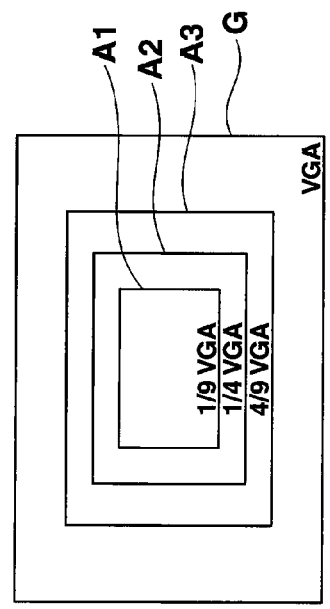
FIG. 9A is a table of setting data for each size of a preview image.
FIG. 9B is a view showing sizes of the preview image in comparison to a display screen.

In a data table shown in FIG. 9A, a width and a height of the preview image to be displayed are set for each size of the preview image. The data table stores setting data of an image size (display area) for each zoom size (angle of view), and setting data of a code extracting target area (width and height) in the preview image, as size information required for zoom size setting processing to be described later. The data table is stored in advance in the ROM 13 shown in FIG. 3.

A selection screen is displayed for size selection of a preview image on the basis of size information such as 4/9 VGA (Video Graphics Array), ¼ VGA, ⅑ VGA, or 1/16 VGA stored in advance in the data table shown in FIG. 9A. When a user inputs a selection instruction from the input device 15, size information data corresponding to the instruction is read out to the RAM 12, and the size of a preview image (an image area) is set. Then, in step S32, coordinates of a preview image display area, i.e., coordinates of the four corners of the display area are set in accordance with the predetermined data or the user operating instruction.

In accordance with the size of the preview image set by the processing described above, image display is performed as follows. That is, as shown in FIG. 9B, a preview image G is displayed when VGA is set, a preview image A1 is displayed when ⅑ VGA is set, a preview image A2 is displayed when ¼ VGA is set, and a preview image A3 is displayed when 4/9 VGA is set. Accordingly, to check the code to be decoded, a preview image can be displayed in a large size. In the case of displaying another information such as a resultant of the decoding, a preview image can be displayed in small size. In this manner, the display size of the captured image can be selected according to the type of usage. Thus, the usability is improved. Further, because a starting position of the image display can be set by the user, it becomes more flexible to arrange the screen layout.

Figure 10A:
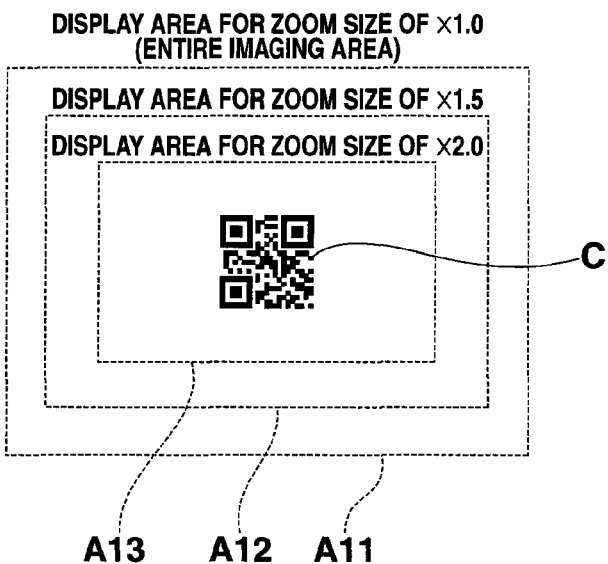
FIG. 10A is a view showing examples of adjustment for the angle of view in the captured image.
Figure 10B:
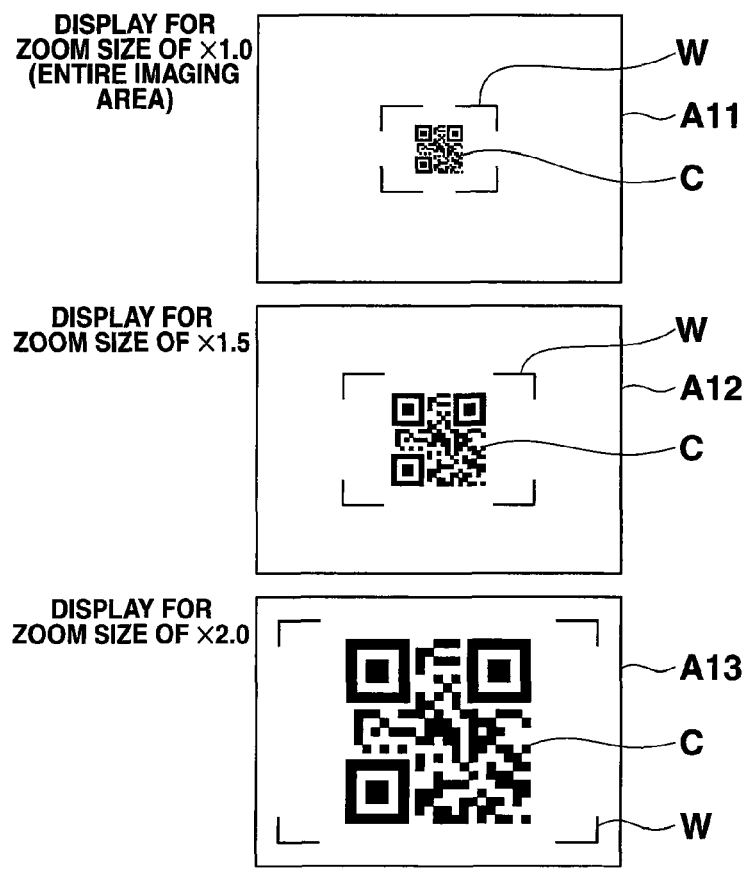
FIG. 10B is a view showing examples of displaying the captured image for each angle of view.

Next, in step S33, setting a frame display is executed to display a frame for distinguishing a code extracting target area from the remaining area. In step S34, setting of a zoom size (angle of view) is executed in accordance with data stored in advance or the operating instruction by the user. A selection screen is displayed for selecting the zoom size (angle of view) stored in the data table shown in FIG. 9A. When the user inputs a selection instruction from the input device 15, accordingly the zoom size is set. As shown in FIG. 10A, in the case where ×1.0 is set, a preview image A11 is extracted, in the case where ×1.5 is set, a preview image A12 is extracted, and in the case where ×2.0 is set, a preview image A13 is extracted, from the entire imaging area including a code C. As shown in FIG. 10B, the extracted zoom image is displayed on the screen.

In step S35, setting processing for displaying the frame is performed. The frame is displayed in order to distinguish a code extracting target area from the remaining area. Details of the setting processing for displaying the frame in step S35 is shown in FIG. 7A.

Figure 7A:
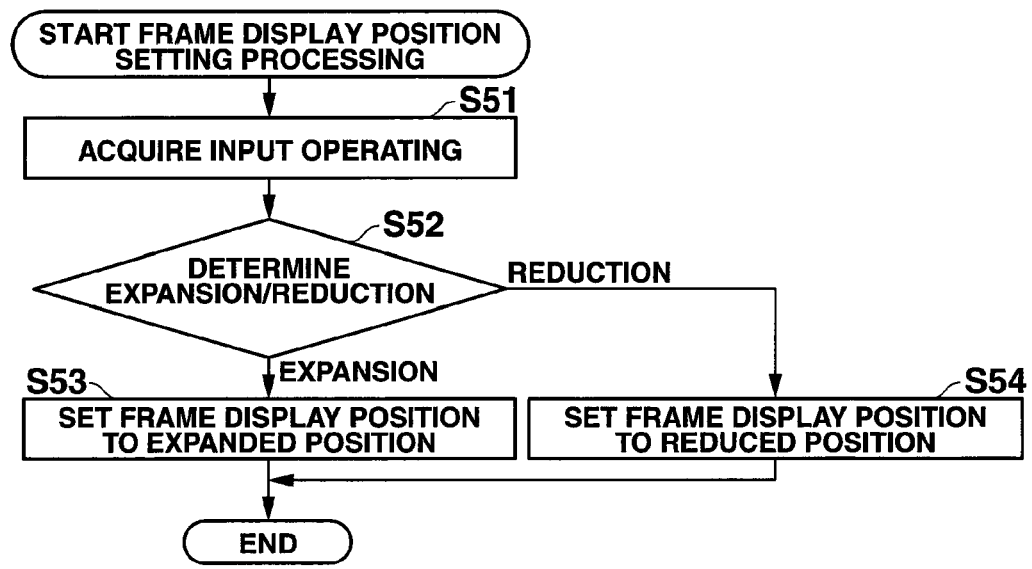
FIG. 7A is a flow chart showing an operation of frame position setting processing in the code reader device 1.

When the frame display setting processing is started, the following processing is executed as shown in FIG. 7A. That is, an input operation from the input device 15 is acquired (step S51), and it is determined whether frame expansion or reduction is instructed (step S52). When expansion is instructed, display position data of the frame is set to a value corresponding to the expansion (step S53). When reduction is instructed, frame display position data is set to a value corresponding to the reduction (step S54). Subsequently the processing terminates.

The frame expansion/reduction setting is performed in such a way that the size data of the code extracting target area, and the size data of the imaging area in the image sensor 114 corresponding to the code extracting target area, not shown in particular, are converted into the data corresponding to the instructed expansion/reduction (refer to FIG. 9A).

Figure 11A:
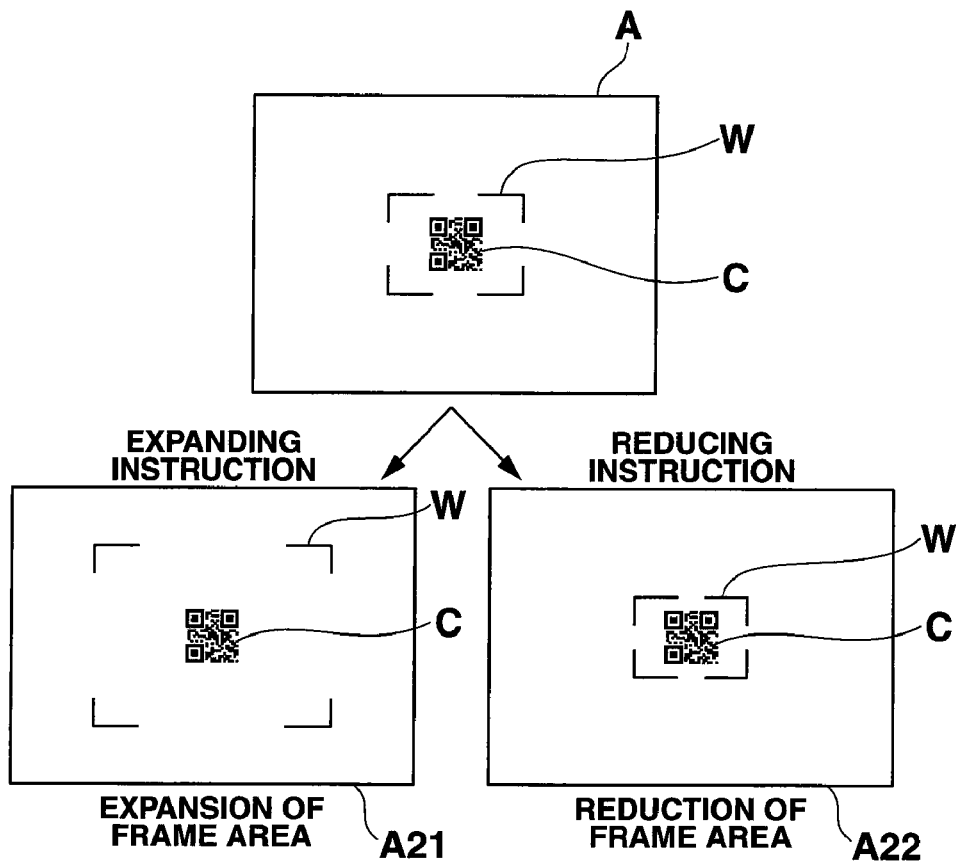
FIG. 11A is a view showing expansion or reduction of an extraction area.

Due to the frame display expansion/reduction setting processing, as shown in FIG. 11A, the frame area, which is a target area of the code extraction, indicated by a code extracting boundary frame W in the preview image A before the setting, is expanded as in the preview image A21, or reduced as in the preview image A22.

Figure 7B:
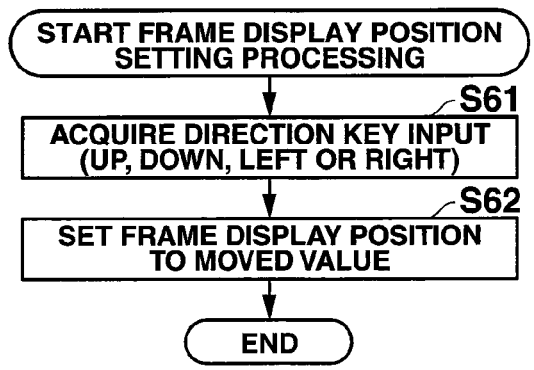
FIG. 7B is a flow chart showing an operation of a modified example of the frame position setting processing.

The frame display setting processing can be modified as shown in FIG. 7B. That is, an instruction indicating a moving direction by the cursor key or the like from the input device 15 is acquired (step S61), and the display position of the frame is determined on the basis of the acquired moving direction and a distance corresponding to a key depressing time or the like (step S62).

The setting for the movement of the frame display position is performed in such a manner that the position data of the code extracting target area, and the position data of the imaging area in the image sensor 114 corresponds to the code extracting target area (both are not shown), are processed to be shifted based on the instructed movement direction and distance.

Figure 11B:
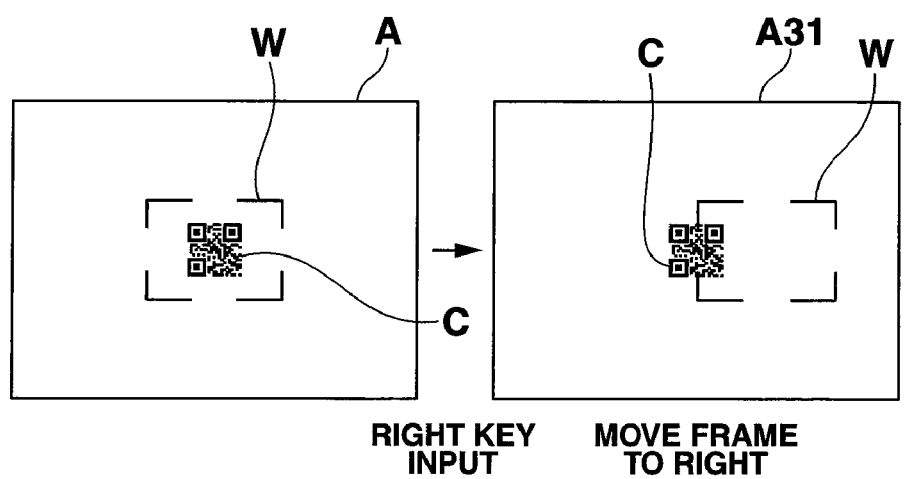
FIG. 11B is a view showing movement of the extraction area.

By the setting processing for the movement of the frame display position, as shown in FIG. 11B, the area of the code extracting target can be moved to an arbitrary location in the displayed captured image (In FIG. 11B, a preview image A32 shows the frame movement to the right).

As a modified example of the frame display setting processing, the frame expansion/reduction processing and the frame position movement processing described above may be used in combination with each other.

Following step S35, an imaging size setting of the camera such as an optical zoom is set (step S36). The frame setting data for each zoom size is calculated based on the preview size, zoom size, and frame display setting, which are determined during the above-described processing (step S37). An area corresponding to the setting zoom size is read out from the buffer 117, whereby the preview image is acquired (step S38). A frame is combined with the preview image based on the calculated frame display data (step S39). The preview image is displayed on the screen of the display device 14 according to the setting size and position (step S40). It is determined whether a termination of the preview display is instructed with the operating instruction from the input device 15 (step S41). When the termination is not instructed, the current processing reverts to step S34. When the termination is instructed, preview display processing is terminated.

Figure 8:
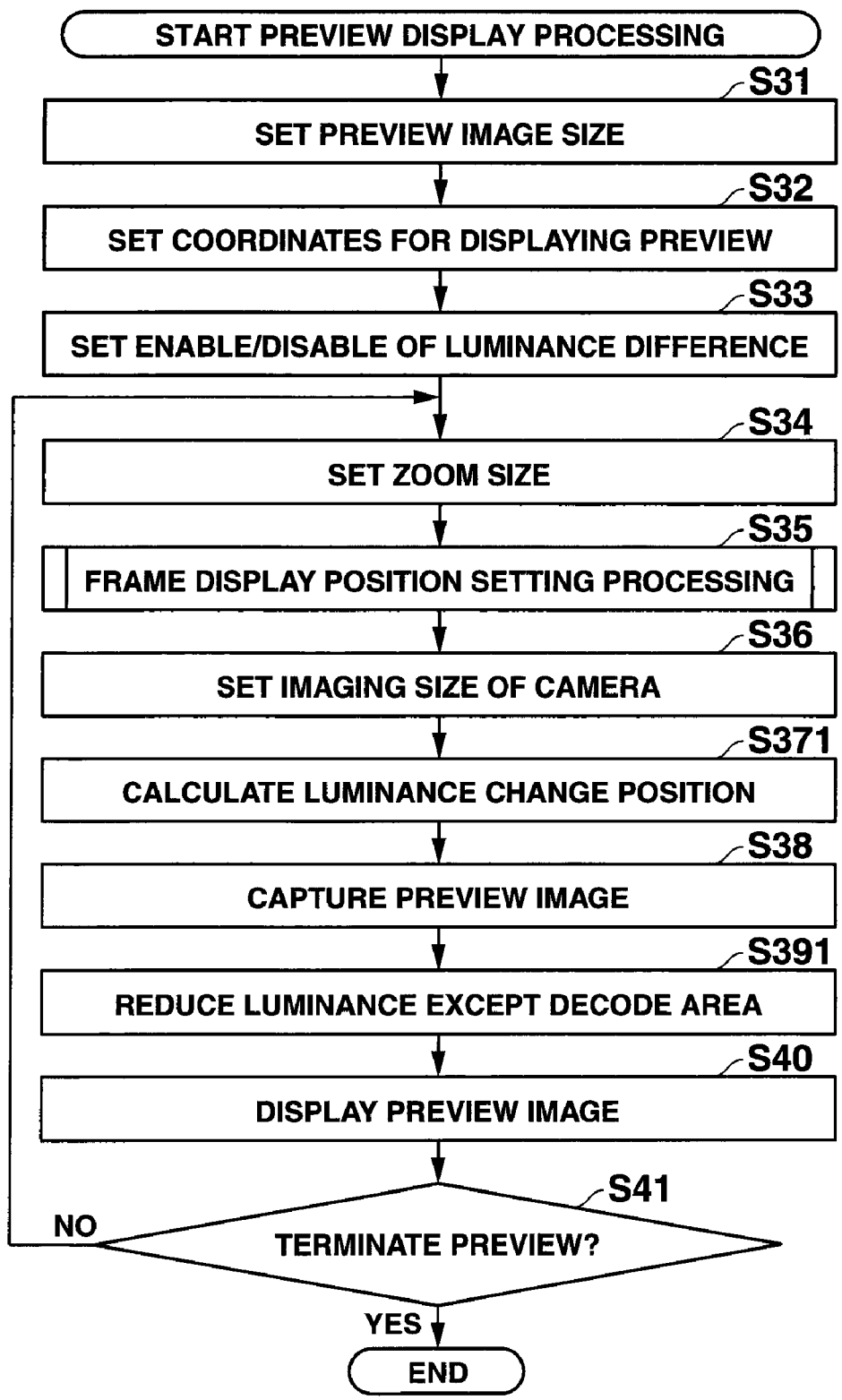
FIG. 8 is a flow chart showing an operation of a modified example of preview display processing shown in FIG. 6.

The preview display processing shown in FIG. 6 may be modified as follows. As shown in FIG. 8, step S37 is replaced by the calculation of the data representing an area in which luminance is changed, for each zoom size (step S371). The calculation is performed on the basis of the preview size, the zoom size, and the frame display position, or the like. The position of the luminance change area is identical to the code extracting target area. Moreover, step S39 is replaced by step S391 in which reduction of display luminance in the captured image except the code extracting target area is performed, according to comparative operation between the data of the luminance change area and the data of the imaging area of the image sensor 114.

In the modified example of the preview display processing, as shown in FIG. 12, an ordinary preview image A41 can be replaced by a preview image A42 obtained by reducing the display luminance outside the code extracting target area. As a consequence, even under the situation in which a frame line indicating the boundary tends to merge into an outside scene (background), the code extracting target area can be easily recognized.

Although the luminance of the code extracting target area may be reduced in reverse, it is preferable to reduce the luminance outside the code extracting target area in order that the code extracting target area is easily recognized. In addition to the luminance change, changing a color tone of the code extracting target area can be applied.

Now, an operation of code reading processing shown in the flow chart shown in FIG. 5 is described hereinafter.

As described above, when the preview display processing shown in step S12 terminates, the flow then goes to step S13. In the step S13, a lens aperture (a focus adjustment may be included) of the camera 11 or the like is set. In the next step S14, an imaging size of the decoding target (decode area) is set based on the predetermined values or the resultant setting values of the frame display position setting processing (step S35). That is, the imaging size is set according to the predetermined data or the size and position data of the code extracting target area on the imaging area of the image sensor 114.

Next, in accordance with the setting of the imaging size, the image of the target area (decode area) set by the above-described processing is captured from the stored image in the buffer 117 (step S15). Image data of the captured decode area is stored in a memory area in the RAM 12 (step S16). On the basis of the stored image data, the decode area is displayed on the display device 14 to be checked (step S17). The, decoding processing for extracting and decoding the code from the decode area is carried out (step S18).

Subsequently, it is determined whether or not the decode processing in step S18 is succeeded, namely, whether or not the information represented by the code such as a predetermined character string is acquired by decoding (step S19). In the case where the information is not acquired, it is determined whether or not a predetermined time is elapsed from the initialization of camera (step S20). When it is determined that the predetermined time is not elapsed, the flow returns to step S15. When it is determined that the predetermined time is elapsed, or when the decoding is succeeded, the flow terminates. When it is determined that the predetermined time is not elapsed, the flow may return to step S13.

As described above, according to the embodiment, prior to the code extraction from the image captured by the camera 11, the code reader device 1 receives the display size of the preview image from the input device 15 for displaying on the display device 14. In response to the image size, based on the setting data stored in the ROM 13, the code extracting target area is displayed on the display device 14 so as to be discriminated with the remaining area of the captured image. Thus, the layout of the captured image on the display screen becomes flexible, so that the usability for the code reading can be improved.

The code reader device 1 displays on the display device 14 the frame indicating the boundary between the code extracting target area and the remaining area in the captured image, therefore it can be easy to recognize the code extracting target area.

The code reader device 1 may display on the display device 14 the preview image such that the luminance of the code extracting target area differs from that of the remaining area. Accordingly the user can recognize a difference between the displayed areas as a plane instead of the boundary line, thus it may be easier to check the code extracting target area.

The code reader device 1 adjusts the zoom size (angle of view) of the captured image by adjusting the extraction area from the imaging area in the image sensor 114, and to display on the display device 14 the captured image subjected to the zoom size (angle of view) adjustment. Therefore, in the case of detecting the code from a wide range of the captured image, or in the case of locating the code precisely in the code extracting target area, the display according to situations can be carried out in a suitable size.

In addition, the code reader device 1 specifies the size and position for the code extracting target area of the captured image according to the instruction of the user from the input device 15, to adjust the code extracting target area based on the specified size and position, and to display the adjusted target area on the display device 14 at a suitable size and position. Therefore, when the user adjusts the code extracting target area, the adjusting status can be recognized on the screen.

The present invention is not limited to the above-described embodiments. The detailed configuration and operation of the code reader device 1 in the embodiments may be modified without departing from the spirit of the invention.

For example, the code reader device 1 may include, other than the RAM 12 and the ROM 13, a hard disk drive (HDD), a nonvolatile memory, and a media drive for an optical/magnetic storage media. The data for displaying the captured image such as the preview image size, the zoom size (angle of view) of the preview image, the size of the code extracting target area, the position of the code extracting target area, and the like may be stored in advance in the above-described storages, instead of specifying the data by the operation from the input device 15.

In order to set the preview size, the zoom size, the frame display position and the like, instead of selecting the data from the values predetermined discretely, the code reader device 1 may calculate an intermediate value of the predetermined discrete values and smoothly set the setting data based on the calculated values.

According to the present invention, the code reader device specifies a display size of the captured image, and displays a code extracting target area according to the specified display size so that the target area is discriminated from the remaining area. As a consequence, a layout of the captured image on the display device becomes flexible, so that the usability for code reading can be improved.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the code reader device 1 is not limited to a portable terminal housing a digital camera or a handy terminal housing a digital camera. That is, according to another embodiment of the present invention, the code reader device 1 may be a portable phone (cellular phone) housing a digital camera or a personal digital assistant (PDA) housing a digital camera.

What is claimed is:

1. A code reader device which is configured to display a subject image captured by an image pickup device, extract image data from a code extracting area of the subject image, and decode a code included in the extracted image data, the code reader device comprising:
    a memory configured to store a data table indicating a relation between (i) preview image area information indicating preview image sizes and preview image areas to be displayed on a display screen, the preview image sizes indicating sizes of the preview image areas, and (ii) code extracting area information indicating code extracting areas which respectively correspond to the preview image areas and which are smaller than the respective corresponding preview image areas;
    an image size specifying unit configured to specify one of the preview image sizes in response to a user operation;
    a display unit configured to (i) read the preview image area information corresponding to the one of the preview image sizes specified by the image size specifying unit and the corresponding code extracting area information from the memory, (ii) set a preview image area on the display screen based on the read preview image area information, (iii) display the subject image captured by the image pickup device in the set preview image area, (iv) set a code extracting area in the preview image area based on the read code extracting area information, and (v) display the set code extracting area so as to be distinguishable from a remaining area of the preview image area; and
    a decode unit configured to extract the image data corresponding to the code extracting area displayed by the display unit from the subject image captured by the image pickup device, and decode the code included in the extracted image data.

2. The code reader device according to claim 1, wherein the display unit is configured to display a frame on a boundary between the code extracting area and the remaining area of the preview image area.

3. The code reader device according to claim 1, wherein the display unit is configured to display the code extracting area with a first luminance level and to display the remaining area of the preview image area with a second luminance level.

4. The code reader device according to claim 1, wherein:
    the data table indicates a relation between the preview image area sizes, the code extracting area sizes, and zoom sizes;
    the image size specifying unit is configured to specify a zoom size in response to a user operation; and
    the display unit is configured to display the preview image area and the code extracting area to have sizes based on the specified zoom size.

5. The code reader device according to claim 1, further comprising an area size specifying unit configured to specify a display size of the code extracting area, wherein the display unit is configured to display the code extracting area based on the display size specified by the area size specifying unit.

6. The code reader device according to claim 1, further comprising an area position specifying unit configured to specify a display position of the code extracting area, wherein the display unit is configured to display the code extracting area based on the display position specified by the area position specifying unit.

7. A non-transitory computer readable recording medium having a program stored thereon that is executable by a computer system, which is used as a code reader device which is configured to display a subject image captured by an image pickup device, extract image data from a code extracting area of the subject image, and decode a code included in the extracted image data, wherein the code reader device comprises a memory configured to store a data table indicating a relation between preview image area information indicating preview image sizes and preview image areas to be displayed on a display screen, the preview image sizes indicating sizes of the preview image areas, and code extracting area information indicating code extracting areas which respectively correspond to the preview image areas and which are smaller than the respective corresponding preview image areas, and wherein the program is executable to cause the computer system to perform functions comprising:
    specifying one of the preview image sizes in response to a user operation;
    reading the preview image area information corresponding to the specified one of the preview image sizes and the corresponding code extracting area information from the memory, setting a preview image area on the display screen based on the read preview image area information, displaying the subject image captured by the image pickup device in the set preview image area, setting a code extracting area in the preview image area based on the read code extracting area information, and displaying the set code extracting area so as to be distinguishable from a remaining area of the preview image area;
    extracting the image data corresponding to the displayed code extracting area from the subject image captured by the image pickup device;
    decoding the code included in the extracted image data.

8. A portable terminal which is configured to display a subject image captured by an image pickup device, extract image data from a code extracting area of the subject image, and decode a code included in the extracted image data, the portable terminal comprising:
    a memory configured to store a data table indicating a relation between (i) preview image area information indicating preview image sizes and preview image areas to be displayed on a display screen, the preview image sizes indicating sizes of the preview image areas, and (ii) code extracting area information indicating code extracting areas which respectively correspond to the preview image areas and which are smaller than the respective corresponding preview image areas;

an image size specifying unit configured to specify one of the preview image sizes in response to a user operation;

a display unit configured to (i) read the preview image area information corresponding to the one of the preview image sizes specified by the image size specifying unit and the corresponding code extracting area information from the memory, (ii) set a preview image area on the display screen based on the read preview image area information, (iii) display the subject image captured by the image pickup device in the set preview image area, (iv) set a code extracting area in the preview image area based on the read code extracting area information, and (v) display the set code extracting area so as to be distinguishable from a remaining area of the preview image area; and a decode unit configured to extract the image data corresponding to the code extracting area displayed by the display unit from the subject image captured by the image pickup device, and decode the code included in the extracted image data.

* * * * *